Patented Apr. 19, 1938

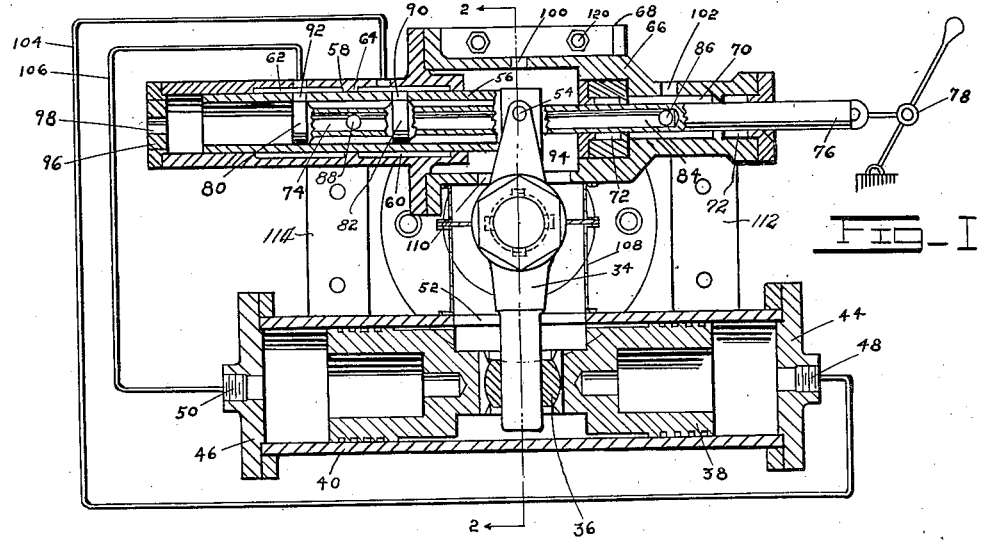

2,114,445

UNITED STATES PATENT OFFICE 2,114,445

POWER TRANSMISSION

Henry G. Gros, Oakville, Conn., assignor to The Waterbury Tool Company, Waterbury, Conn., a corporation of Connecticut Application January 21, 1936, Serial No. 60,149

5 Claims. (Cl. 103—38)

This invention relates to power transmission devices, particularly to those whereby it is possible to transmit power between a driving and a driven member at selectively variable speed ratios between the members. Transmission devices of this character are used for numerous purposes particularly where it is desirable to utilize a constant speed prime mover for driving a load device at selectively variable speeds and include usually a member which may be moved to vary the speed ratio between the driving and driven members. This member may be operated in any of several ways, such as by a servo-motor, either electric or hydraulic, or by a mechanical linkage usually arranged to provide a definite mechanical advantage.

Since any control mechanism of this nature usually projects from the casing proper, it frequently happens that a suitable location of the control mechanism for one set of conditions will not be suitable for another. For example, in adapting a transmission to be built into driven machines of various characters one machine may require that the control mechanism be located in one position while another machine may require it to be located in an entirely different position due to the limitations of available space or to considerations of required direction of movement of the control member. These considerations have heretofore been taken care of by specially designed and built transmissions for each particular condition encountered, thus making the initial cost of the devices high due to the necessity of special design, building special patterns, and in general the inability to take advantage of any of the well-known economies of quantity production.

It is an object of the present invention to provide a control mechanism for a variable speed transmission by which the same parts may be assembled in various ways in order to more flexibly meet the space limitations imposed by a particular application.

A further object is to provide a variable speed power transmission having a control apparatus which may be mounted on a transmission in any of a plurality of positions and which is furthermore more compact than control apparatus heretofore constructed.

Another object is to provide a servo-motor construction for oscillating a member in response to movements of a control member which is of compact, efficient and reliable construction.

Further objects and advantages of the present invention will be apparent from the following description, reference being had to the accompanying drawing wherein a preferred form of the present invention is clearly shown.

In the drawing:

Fig. 1 is a sectional view taken on line 1—1 of Fig. 2 of a servo-motor control apparatus embodying one form of the present invention.

Fig. 2 is a cross section of line 2—2 of Fig. 1 a portion of the transmission being shown therewith.

Fig. 3 is a top view partly in section of a variable speed transmission embodying the present invention.

Referring to Fig. 3, there is illustrated a variable displacement pump or "A-end" 10 of the well-known Waterbury type which includes a revolving cylinder barrel 12 having pistons 14 reciprocable in cylinder bores 16. A driving shaft 18, which may be connected to a suitable prime mover, not shown, drives the cylinder barrel 12, and also a socket ring 20 which is journalled in a tilting box 22. The displacement of the pump is varied by moving the tilting box 22 about its trunnions 24 to alter its angle of inclination to the shaft 18. The "A-end" 10 forms part of a variable speed power transmission which may comprise in addition thereto a hydraulic motor formed by a double acting cylinder 21, piston 23 and supply and return conduits 25, the piston rod 27 being connected to a suitable load device which it is desired to reciprocate. It will be understood that the "A-end" may supply fluid under pressure to any other suitable form of hydraulic motor, either rotary or rectilinear, for example, a fixed displacement motor or "B-end" similar to the "A-end" 10 except that the socket ring rotates in a fixed angle box, and that the speed and direction of movement of the motor may be varied by varying the angle of the tilting box 22 with respect to the shaft 18.

The tilting box 22 is provided adjacent one of its trunnions 24 with a shaft portion 26 projecting through the casing 28 of the "A-end" 10. The shaft portion 26 carries rigidly secured thereon, by means of keys 30 and nut 32, a two armed lever 34. The lower part of the lever 34 is cylindrical in form and carries slidably mounted thereon a pivot block 36 which is pivotally mounted in a double-ended operating piston 38. Piston 38 is slidably mounted within a cylinder member 40 having a mounting boss 42 thereon by which the member 40 may be attached to the casing 28. The opposite ends of the cylinder member 40 are closed by heads 44 and 46 respectively having fluid connections 48 and 50 therein. An opening 52 is provided in the upper side wall of the cylinder 40 to provide clearance for limited axial movement of the arm 34.

The upper end of the arm 34 is bifurcated as illustrated in Fig. 2 and is connected by means of a pivoting and sliding connection 54 with a tubular following valve member 56. The member 56 is slidably mounted within a valve body 58 having relieved portions forming chambers 60 and 62 separated by a land 64 within its interior bore. Valve body 58 is mounted in a member 66 which is formed with a boss 68 for mounting the members 58 and 66 upon the casing 28. Member 66 is provided with a central bore at its right-hand end having a relieved portion forming a chamber 70 and carries packing glands 72 at opposite ends thereof. Within this bore and the interior bore of the tubular valve member 56 there is mounted a pilot valve member 74 having a stem 76 connected to a suitable operating means indicated diagrammatically as hand lever 78. The valve member 74 is formed with heads 80 and 82 slidably fitting the bore of the valve member 56. A central bore 84 connects the space between the heads 80 and 82 with the chamber 70 and member 66 by means of lateral holes 86 and 88. The tubular valve member 56 is formed with passages 90 and 92 of substantially the same width as the valve heads 80 and 82, and communicating with the chambers 60 and 62 in all positions of the valve member 56.

The right-hand end of the interior bore of the follow-up valve 56 is open around the stem 76 communicating with a chamber 94 formed in the member 66. The left-hand end of the valve body 58 is closed by a cap 96 having a passage 98 therethrough for connection to the usual expansion tank or other suitable exhaust for spent fluid. Likewise, the chamber 94 is provided with an outlet 100 which may be similarly connected. A passage 102 communicates with the chamber 70 in the member 66 and is suitably connected to a source of fluid under pressure, for example, an auxiliary constant displacement pump 99, driven from shaft 18 by a chain and sprocket drive 101. The chamber 60 in valve body 58 communicates by means of a conduit 104 with the passage 48 of the cylinder head 44, while the chamber 62 communicates by a conduit 106 with the passage 50 of the cylinder head 46. A two-part tubular housing 108 is fastened between the members 66 and 40 to close the openings 52 and 110 through which the arm 34 extends.

The casing 28 is provided with a plurality of pads 112, 114, 116, and 118 by which the control mechanism may be mounted on the housing in any of a plurality of various positions. Thus, the mechanism is illustrated as having the follow-up valve mechanism mounted by means of its boss 68 on the pad 118, while the operating cylinder 40 is mounted with its boss 42 on the pad 116, suitable fastenings being provided at 120.

In operation the angle of the tilting box 22 may be varied by moving the stem 76. Thus, if it is desired to move the tilting box clockwise in Fig. 1, the lever 78 will be moved clockwise drawing the pilot valve 74 to the right. Fluid under pressure is thus admitted to the right-hand end of the cylinder 40 from the auxiliary pump through the port 102, chamber 70, hole 86, bore 84, hole 88, port 90, chamber 60, conduit 104 and passage 48. Fluid is likewise permitted to exhaust from the left-hand end of the cylinder 40 through passage 50, conduit 106, chamber 62, port 92, and port 98 to the expansion tank. The piston 38 is thereby moved to the left by an amount corresponding to the movement of control lever 78 and with it carries the following valve 76. As soon as this movement is completed, valve 56 again closes the ports 90 and 92 cutting off the supply and exhaust of fluid to the opposite ends of the cylinder 40. Thus, the tilting box 22 may be moved with little effort precisely to any position desired under the influence of the control lever 78. If the shaft 18 is driven by a constant speed prime mover, such as an ordinary electric motor, the direction and speed of movement of the load device which is connected to piston rod 27 depends upon the position of the tilting box 22, since its position determines the quantity and direction of the fluid pumped by the "A-end" 10. It will be evident therefore that the speed and direction of movement of the load device may be easily and accurately regulated by operation of the control lever 78.

It will be seen that the follow-up valve and the operating cylinder mechanism may be mounted on the casing in any of a plurality of positions and may be moved from one position to another as desired. For example, should it be found that space limitations prevent the mounting of the control mechanism in the position illustrated or should it be desired to have the longitudinal movement of the stem 76 in the vertical rather than in the horizontal direction, the arm 34 may be assembled on the shaft portion 26 with its short arm pointing to the left in Fig. 1 and its long arm pointing to the right. The member 56 may then be mounted with its boss 68 on the pad 114 and the cylinder 40 mounted with its boss 42 on the pad 112. Likewise, in the form of the apparatus illustrated, the control mechanism may be mounted in either of two other positions, that is, with the follow-up valve at the bottom in Fig. 1 and the stem 76 pointing to the left, or with the follow-up valve at the right and the stem 76 pointing downwardly. Thus, the mechanism is easily adaptable to various requirements encountered in various applications of the transmission.

In addition, it will be noted that the trunnions 24 are mounted in removable and interchangeable bearings 122 and 124. Thus, if it is necessary or desirable to locate the control mechanism upon the opposite side of the casing, this may be done by assembling the pump with the shaft portion 26 projecting from the opposite side of the casing by merely interchanging the location of the trunnion bearings 122 and 124, there being a corresponding set of pads 112', 114', 116' and 118' for accommodation of the bosses 42 and 68.

It will thus be seen that the present invention provides not only a compact, simple and reliable servo-motor mechanism for controlling the transmission, but in addition provides one which may be assembled with the transmission in any of a large number of positions to meet any particular requirements encountered as to location of the control mechanism.

While the form of embodiment of the invention as herein disclosed, constitutes a preferred form, it is to be understood that other forms might be adopted, all coming within the scope of the claims which follow.

What is claimed is as follows:

1. In a variable displacement pump or motor machine the combination of a casing, an oscillatable member for varying the displacement of the machine and extending outwardly of the pump casing, a fluid motor for moving the member in either direction, a pilot valve for controlling the admission of fluid to the motor, a follow-up valve operated by the member for also controlling the admission of fluid to the motor, and means for mounting the motor and valve mechanism on the outside of the casing, adjacent the member in any one of a plurality of angularly spaced positions around the member.

2. In a variable displacement pump or motor machine the combination of a casing, an oscillatable member for varying the displacement of the machine and extending outwardly of the pump casing, a fluid motor for moving the member in either direction, a pilot valve for controlling the admission of fluid to the motor, a follow-up valve operated by the member for also controlling the admission of fluid to the motor, and means for mounting the motor and valve mechanism on the outside of the casing, adjacent the member in any one of a plurality of angularly spaced positions around the member with the motor and valve mechanism on opposite sides of the member respectively.

3. In a variable speed power transmission device the combination of a casing, an oscillatable member for varying the speed ratio of the transmission and extending outwardly of the transmission casing, a fluid motor for moving the member in either direction, a pilot valve for controlling the admission of fluid to the motor, a follow-up valve operated by the member for also controlling the admission of fluid to the motor, and means for mounting the motor and valve mechanism on the outside of the casing, adjacent the member in any one of a plurality of angularly spaced positions around the member.

4. In a variable speed power transmission device, the combination of a casing having a flat side, an oscillatable member for varying the speed ratio of the transmission and extending outside the casing perpendicularly from said flat side at the central portion thereof, control means for oscillating said member including a control member mounted for rectilinear movement perpendicular to and spaced from the axis of the oscillatable member, means for imparting to the oscillatable member oscillatory movements corresponding to the rectilinear movements of the control member, and means for mounting the control means on the outside of the casing in any of a plurality of positions angularly spaced about the axis of the oscillatable member.

5. In a variable speed power transmission device the combination of a casing having a flat side, an oscillatable member for varying the speed ratio of the transmission and extending outwardly of the pump casing perpendicularly from said flat side at the central portion thereof, a fluid motor for moving the member in either direction, a pilot valve for controlling the admission of fluid to the motor, a follow-up valve operated by the member for also controlling the admission of fluid to the motor, and means for mounting the motor and valve mechanism outside the casing, adjacent the member in any one of a plurality of angularly spaced positions around the member, said valves lying along said flat side at one side of the member and said motor lying along said flat side at the other side of the member.

HENRY G. GROS.